United States Patent
Adler

[11] 3,861,197
[45] Jan. 21, 1975

[54] METHOD AND APPARATUS FOR DETERMINING THE VISCOSITY OF A LIQUID SAMPLE

[75] Inventor: Stanford L. Adler, Monsey, N.Y.

[73] Assignee: Technicon Instruments Corporation, Tarrytown, N.Y.

[22] Filed: June 29, 1973

[21] Appl. No.: 375,223

[52] U.S. Cl. ............... 73/59, 23/230 B, 73/64.1, 356/196
[51] Int. Cl. .......................................... G01n 11/14
[58] Field of Search .................. 73/53, 54, 59, 64.1; 356/39, 70, 196, 197, 198; 23/230 B

[56] References Cited
UNITED STATES PATENTS

| | | | |
|---|---|---|---|
| 3,216,240 | 11/1965 | Adler et al. | 73/59 X |
| 3,496,762 | 2/1970 | Gaeta | 73/54 |
| 3,520,659 | 7/1970 | Steinberg et al. | 73/59 X |
| 3,650,698 | 3/1972 | Adler | 73/64.1 X |
| 3,667,286 | 6/1972 | Kaufman et al. | 73/59 |
| 3,752,443 | 8/1973 | Lichtenstein | 356/39 X |

FOREIGN PATENTS OR APPLICATIONS
65,839  9/1968  Japan..................... 73/59

*Primary Examiner*—Jerry W. Myracle
*Assistant Examiner*—Joseph W. Roskos
*Attorney, Agent, or Firm*—S. P. Tedesco; S. E. Rockwell

[57] ABSTRACT

Apparatus and method for determining the viscosity of a liquid sample, comprising supporting a quantity of the sample with a surface thereof exposed to the ambient atmosphere, placing a magnetic wafer on the sample surface, for support thereon, generating a rotating magnetic field about the center of the wafer to spin the wafer on its center, and monitoring the rate of rotation of the wafer as an indication of the viscosity of the sample. Further applications include detecting a change in the viscosity of a sample and determinations of Prothrombin Time and Partial Thromboplastin Time of blood specimens, and various other uses where the end point of a reaction in a sample mixture is evidenced by a change of viscosity.

20 Claims, 7 Drawing Figures

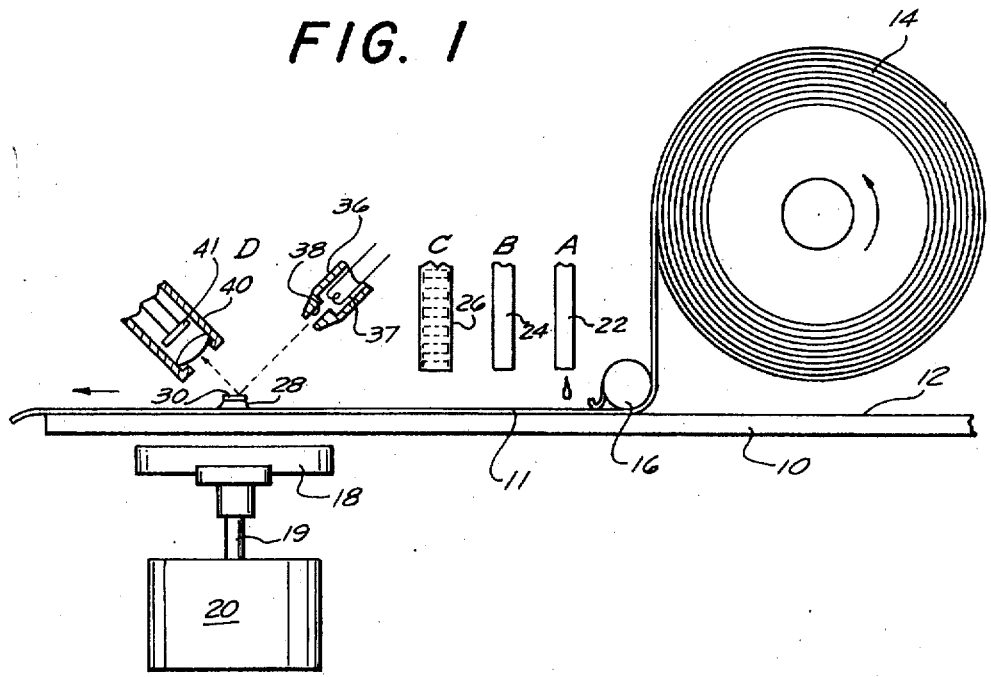
FIG. 1
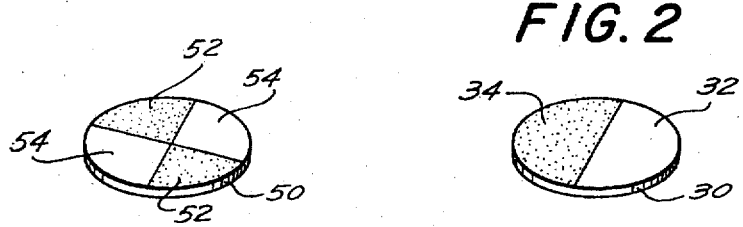
FIG. 2
FIG. 3

METHOD AND APPARATUS FOR DETERMINING THE VISCOSITY OF A LIQUID SAMPLE

BACKGROUND OF THE INVENTION

1. Field of the Invention

This invention relates to viscosity testing and relates more particularly to the determination of an unknown viscosity under predetermined conditions and also the determination of changes in viscosity with reference to increasing or decreasing viscosity under predetermined conditions, which changes may extend over a period of time.

2. Prior Art

In my U.S. Pat. No. 3,650,698 issued Mar. 21, 1972 there is illustrated and described a method and apparatus for, among other stated uses, the determination of the coagulation rate of blood specimens known as Prothrombin Time and which is readily adaptable to determinations of Partial Thromboplastin Time of such specimens. As shown and described in that patent a droplet of blood plasma is deposited on a substrate tape to mix with a reagent comprising magnetic iron oxide particles at one station. The tape is advanced to bring the mixture to a second station at which a further reagent is added to the mixture which starts a timer, and the sample-reagent volume is mixed by a rotating magnetic field acting on the magnetic iron oxide particles. As this mixing continues, the tape supporting the sample-reagent volume is advanced to bring the volume to a third station at which the mixing continues, the mixture being opaque. As strands of fibrin form in the mixture as in the clotting of blood, these strands sweep up the magnetic iron oxide particles and the mixture becomes translucent throughout the major portion thereof. This change in the optical property of the mixture indicating the end of the reaction and the change in viscosity is sensed by an optical sensor which acts to shut off the timer. Hence, such viscosity testing is dependent on an optical change in the sample and also dependent on the use of magnetic particles in the sample mixture, and these features limit the application of the technique to certain viscosity testing applications. It is desired to avoid these limitations.

In Adler et al. U.S. Pat. No. 3,216,240 issued Nov. 9, 1965, there is shown and described viscosity testing apparatus which does not have these limitations and which is useful, for example, in determining the Prothrombin Time of blood specimens. As described in that patent the sample is placed in means defining a well for the sample and further defining axle supports at opposite sides of the well. The reagent or reagents are added to the sample. A disc is employed having an axle provided at its center and protruding from both faces of the disc. The disc is immersed in the liquid of the well to the extent of a fractional portion of its radius in edgewise relation, with the axle being supported on the axle supports so that the disc may rotate. A portion of the disc which is opaque carries an iron wire and another portion is opaque. A remaining portion or portions of the disc are transparent or have voids therein. Light from a source is directed at one side of the disc toward a photodetector at the other side of the disc, and the light beam is chopped by the disc as the disc rotates under the unfluence of a rotating magnetic field. As the viscosity of the sample increases the rate of revolutions of the disc per unit of time decreases and finally the disc ceases to rotate at the end of the reaction which cessation is sensed by the photodetector.

The viscosity testing technique of aforementioned U.S. Pat. No. 3,216,240 has a number of drawbacks, the most serious of which is probably lack of good reproducibility with reference to tests of specimens from the same source or lack of precision in tests of specimens from different sources. The disc axle may be bent. A bent axle will affect the test results. Moreover at the end of a test, when the disc has ceased to rotate, the disc may have a tendency to oscillate somewhat, in a manner to have continuing chopping effect on the light beam which is sensed by the photodetector. The drag of the specimen on the disc when the latter is rotated by the magnetic field is also dependent somewhat on the volume of the liquid in the well which affects the extent of immersion of the disc into the liquid. Most viscosity tests are temperature responsive, and the spinning disc has a tendency to pick up liquid from the well and then return at least a portion of it thereby effecting a disadvantageous temperature change. Furthermore, the rotating disc has a tendency to splash the liquid. It is desired to overcome these drawbacks and to provide apparatus and a method for viscosity testing having wide applications.

SUMMARY OF THE INVENTION

One object of the invention is to provide an improved method and apparatus for testing the viscosity of a sample. Another object is to provide such method and apparatus which is well suited to performing viscosity tests sequentially on a series of such samples and which may be readily automated. A further object is to provide such apparatus and method which in their applications to viscosity testing have a very wide scope. Further there is provided apparatus and a method for determining the viscosity of a liquid sample, comprising supporting a quantity of the sample with a surface thereof exposed to the ambient atmosphere, placing a magnetic wafer on the sample surface thereon, and generating a rotating magnetic field about the center of the wafer to spin the wafer on its center. The technique further includes monitoring the rate of rotation of the wafer as an indication of the viscosity of the sample.

BRIEF DESCRIPTION OF THE DRAWINGS

In the drawings:

FIG. 1 is a somewhat schematic view in side elevation and partially in section showing apparatus for testing the viscosity of samples, embodying the invention;

FIG. 2 is a detail view illustrating in perspective a wafer of magnetic material utilized in the apparatus of FIG. 1;

FIG. 3 is a view similar to FIG. 2, illustrating a modified form of the wafer;

DETAILED DESCRIPTION OF THE PREFERRED EMBODIMENTS

Figure 4:
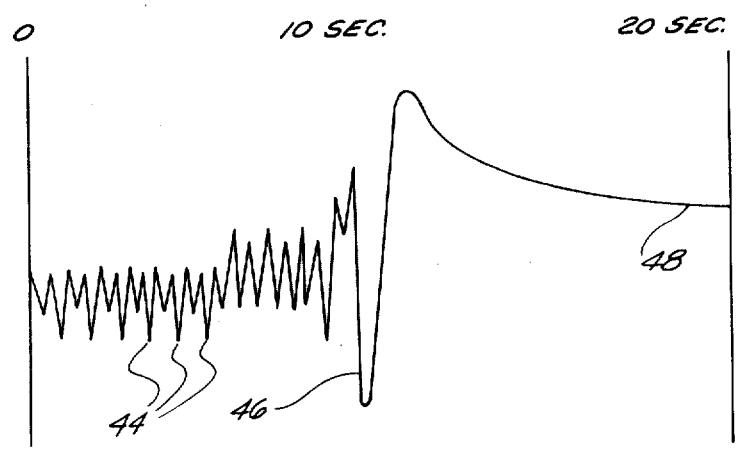
FIG. 4 is a view illustrating a pen recording of the action of the disc of FIG. 2 under the influence of a rotating magnetic field that is generated by the apparatus of FIG. 1.

In FIG. 1, there is shown an elongated horizontally arranged support 10 which may be temperature controlled in a manner not shown and which may have an upper surface 12 provided with a light reflective surface or provided with an opaque surface. An opaque or clear tape 14 has a run along at least a portion of the length of the surface 12. The tape may be structured conveniently of a plastic material such as Mylar, for example, and may be fed from a suitably supported supply roll 14. The tape from the supply roll 14 may be fed intermittently by a nonillustrated take-up roll. On the upper surface 12 of the tape support 10, which support is structured of non-magnetic material, there is provided a tape hold-down device 16 between which and the support 10 the tape 11 is movable lengthwise of the support 10.

Spaced below the support 10 is a rotary bar magnet 18 which is horizontally arranged and which has a magnetic field extending through the tape support 10, the tape 11 and which extends above the tape 11 in the manner of the field of the rotary bar magnet of my aforementioned U.S. Pat. No. 3,650,698. The bar magnet has a rotary axis at the mid-point between its ends, and is driven on this axis by a shaft 19 of an electric motor 20. The motor 20 is operated intermittently or continuously.

Spaced a distance above the run of the tape in a fixed position is a first station A at which a volume of the sample to be tested is dispensed to fall onto the tape by gravity and form a droplet thereon. The dispensed volume of sample may be on the order of approximately 1/60 ml. The last-mentioned sample volume is dispensed while the tape is stationary. The tape is then advanced to bring the droplet on the tape to the second station B at which a reagent is dispensed, if such reagent is necessary to the particular test being carried out, to fall by gravity onto the previously deposited droplet on the tape and thereby form with such droplet a larger droplet. The tape is stationary while such reagent is dispensed. If the particular test being carried out is for the Prothrombin Time of a blood plasma specimen the sample volume discharged at station A consists of such plasma and the reagent added at station B is a mixture of thromboplastin plastin and calcium solution. The sample volume dispensed at station A is illustrated as discharged by a tube 22, and a similar tube 24 is illustrated as dispensing the reagent.

The tape is advanced again and then stopped to position the previously enlarged droplet on the tape a distance below a tubular wafer magazine 26 at station C. A wafer from the magazine 26 is discharged by the latter to fall by gravity for placement on the meniscus of the droplet on the tape in flatwise relationship. The wafer is supported by the surface tension of the droplet. The tape is advanced again and stopped to position the droplet with the wafer supported thereon at station D in which the center of the droplet and the center of the disc are disposed in alignment with the rotary axis of the bar magnet 10, the droplet in this condition being indicated at 28 and the wafer 30.

The wafer 30 may be of the form shown in FIG. 2 and may be structured of a monolayer or plural layers of plastic film incorporating particles of magnetic iron oxide. Such film is commonly employed in audio recording tape. The wafer 30 shown in FIG. 2 is of disc form and may have an upper surface divided in half, with one surface portion 32 having a reflecting coating and the other surface portion 34 having a nonreflective coating or finish.

Spaced a distance above the tape run is a suitably supported lamp housing 36 directing light through an aperture 38 therein from a lamp 37 in the housing upon an eccentric portion of the wafer 30 when the wafer and supporting droplet are in the last-mentioned position which is at station D. At the last-mentioned station, a housing 40 houses a photodetector 41 which is focused on the same eccentric portion of the wafer 30 which is irradiated by the light beam from the lamp 37. When the sample droplet mixture supporting on its meniscus the wafer 30 is at the station D the bar magnet motor 20 is operated to spin the wafer 30 and create a similar motion in a portion of the droplet. As the wafer spins under the influence of the rotating magnetic field of the magnet 18, the alternate reflective and nonreflective portions 32 and 34 respectively of the disc 30 passing through the irradiation of the light beam cause fluctuations in the light intensity detected by the photodetector focused on the wafer.

These fluctuations in light intensity generate signals which drive in a conventional manner a nonillustrated pen recorder which makes a trace as shown in FIG. 4 on a driven chart 43, indicative of how fast the wafer rotates and which also indicates when the speed of rotation lessens, and further indicates when rotation ceases. For example, the inverted peaks 44 of the tracing indicate revolutions of the disc 30 in units of time. As shown in FIG. 4, the portion 46 of the tracing indicates the slowdown of the revolutions per unit of time of the wafer, and the portion 48 of the tracing indicates that rotation of the wafer 30 has ceased due to the end point of the reaction, which in the case of a blood plasma specimen under test has been described with reference to Prothrombin Time. As shown in FIG. 4, the reaction end point occurs after the interval of 20 seconds of elapsed time. The specimen may be whole blood. The timing of the test by a nonillustrated timer may be commenced by the operation of the motor 20 or earlier. The timer may be similar to that shown and described in aforementioned U.S. Pat. No. 3,650,698. The nonillustrated timer may be shut off by a signal which is generated from the photodetector 41 when rotation of the wafer 30 ceases. The tape is again advanced and stopped, and then the cycle may be repeated.

There is shown in FIG. 3 a modified form of wafer 50 which is similar to the above-described wafer 30 in that it contains magnetic iron oxide particles or the equivalent and is structured of film or the like and is disc shaped. The wafer 50 has twin upper surface portions 52 provided with an opaque finish which may be black and twin surface portions 54 having a white finish. The wafer 50 may be utilized in the same manner as the wafer 30. If the wafer 50 is rotated at the same speed as the first portion of the rotation of the wafer 30, twice as many light fluctuations are registered on the photodetector 41 as each of the surface portions 52 and 54 occupies a quarter of the surface of the disc 50 and has the outline shown in FIG. 3. Obviously, magnetic material is not required in a wafer such as the previously described wafers. For example, a wafer, if constructed of aluminum for example, may be rotated by an energy field such as that generated by an eddy-current motor.

It will be evident from the foregoing that the apparatus of FIG. 1 may be utilized to provide viscosity tests for a series of samples deposited sequentially on the tape 11 and each receiving thereon a wafer 30 or 50 which is spun on the respective sample volumes and monitored in the aforementioned manner for the detection of Prothrombin Time for example. If the series of samples constitutes unknown samples of lubricating oil, for example, for viscosity testing the viscosity may be lowered during testing, if desired, by the temperature control of the tape support 10, or another substance may be added to each droplet respectively at station B from tube 24 to effect a lower viscosity in the sample for example.

Figure 6:
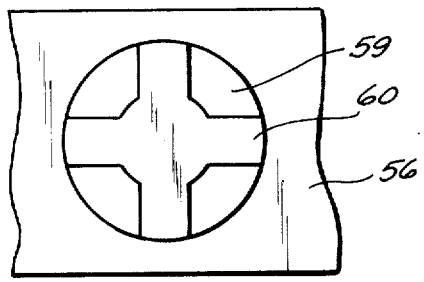
FIG. 6 is a fragmentary top plan view of the apparatus of FIG. 5 omitting certain elements for simplification.
Figure 5:
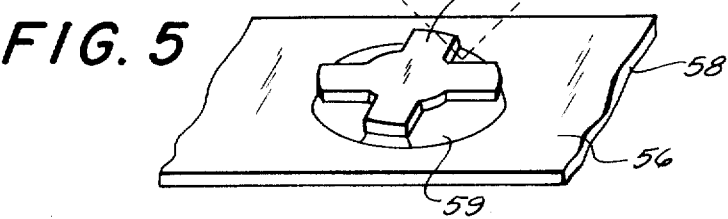
FIG. 5 is a perspective view illustrating a modification of the apparatus of FIG. 1.

In the modified form of FIGS. 5 and 6, the movable tape is omitted with stations A, B and C and the sample, in the form of a droplet 59, which sample may be clear lubricating oil of unknown viscosity, may be manually deposited on the reflective upper surface 56 of a temperature-controlled support 58 similar to the aforementioned support 10. Such sample volume must be deposited so as to have its center substantially on the axis of the nonillustrated rotary bar magnet which may be identical to that described hereinbefore. A wafer 60 similar to the aforementioned wafers of FIGS. 2 and 3 may be deposited manually or otherwise so as to also have its center substantially on the axis of the nonillustrated rotary bar magnet. The wafer 60 differs from the previously described wafers 30 and 50 in that it is not of disc shape but has an irregular though symmetrical outline. The illustrated wafer 60 is generally of cruciform structure and like the previously described wafers 30 and 50 contains magnetic iron oxide particles and may be structured of film. The entire upper surface of the wafer 60 is opaque.

As in the form of FIG. 1, light from a lamp in a lamp housing 62 is directed to irradiate a point or spot eccentric to the center of the wafer 60 and the photodetector in the housing 64 is similarly aimed at the last-mentioned spot. The focus of the light beam from the housing 62, together with the focus of the photodetector in the housing 64 is such that, as the wafer 60 is caused to rotate in the rotating magnetic field of a nonillustrated bar magnet, the focus is on alternately one portion of the reflective surface 56 of the support below the clear sample and on the successive opaque projections of the cruciform wafer 60 and through recesses therebetween so that the intensity of light detected by the photodetector fluctuates and generates signals, as in the form of FIG. 1, for use as indications of the speed of rotation of the wafer 60. During such viscosity testing, as in the form of FIG. 1, the viscosity of the sample under test may be maintained constant, as in testing lubricating oil, or may be increased or decreased through the temperature control of the support 58. Moreover, particularly the apparatus shown in FIG. 5 is useful for the purpose of determining a lessening viscosity of a gelatinous sample deposited on the support 58 with the wafer 60 thereupon, where the sample undergoing testing is raised in temperature.

Figure 7:
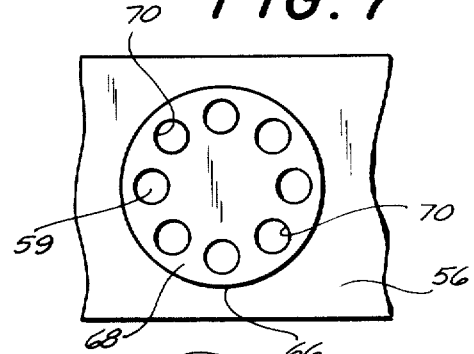
FIG. 7 is a view similar to FIG. 6 but illustrates a further modified form of wafer.
Figure 7:
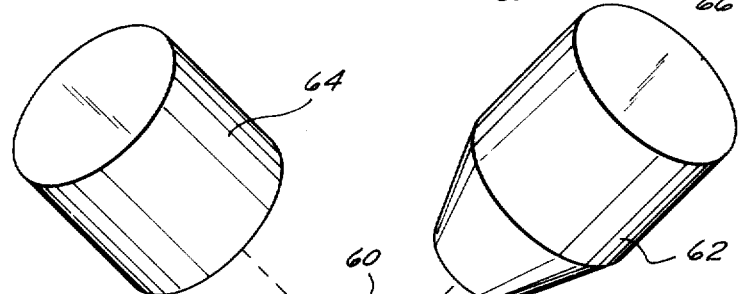

In FIG. 7 there is shown a wafer 66 having an opaque upper surface 68 and which is similar to the previously described wafer 60 but is circular in outline. The wafer 66 is provided with a circular array of voids through which the reflective surface 56 of the support may be viewed when the sample beneath the wafer 66 and supported on the surface 56 is clear. As in the form of FIG. 5, the photodetector is focused so that as the wafer 66 is rotated the photodetector picks up changes in light intensity as the focus is through successive ones of the voids 70 from the reflective surface 56 and respective ones of the opaque surface portions of the wafer 66 between the voids 70.

Returning again to the form of FIG. 1, if the upper surface 12 of the tape support 10 is reflective and if the sample or any mixture thereof which is deposited on the tape is clear and the tape is clear, either the wafer 60 of FIG. 6 or the wafer 66 of FIG. 7 may be utilized for viscosity testing. It is to be understood that either of the wafers 30 or 50 may be utilized with the apparatus of FIG. 5 irrespective of whether or not the sample is clear or opaque.

While several forms of the method and apparatus for performing viscosity tests have been illustrated and described herein it will be apparent, especially to those versed in the art, that the invention may take other forms and is susceptible of various changes in details without departure from the principles of the invention.

What is claimed is:

1. A method of determining the viscosity of a liquid sample, comprising:
   supporting with a stationary support a volume of the sample with an exposed surface thereof forming a meniscus;
   placing a wafer on said meniscus for support thereon;
   rotating the wafer to spin the wafer on said meniscus of the sample and establish motion in the sample; and
   monitoring by reflectance the rate of rotation of the wafer as an indication of the viscosity of the sample.

2. A method as defined in claim 1, further including treating the sample on said support to effect a change in its viscosity.

3. A method as defined in claim 2, wherein: said sample treatment comprises effecting a temperature change of said support.

4. A method as defined in claim 2, wherein: said sample treatment comprises the addition to the sample on said support of a liquid substance prior to said placement of said wafer.

5. A method as defined in claim 1, further including treating the sample on said support to effect a change in its viscosity and detecting a change in the rate of rotation of said wafer as an indication of the viscosity change in the sample.

6. A method as defined in claim 1, further including treating the sample to enable it to coagulate over a period of time and timing the interval from a predetermined starting point to the cessation of rotation of said wafer as an indication of the coagulation rate of said sample.

7. A method as defined in claim 6, wherein: the sample is blood plasma.

8. A method as defined in claim 6, wherein: the sample is whole blood.

9. A method as defined in claim 1, wherein: the sample volume is in the form of a droplet.

10. A method as defined in claim 1, wherein: the sample is opaque.

11. A method as defined in claim 1, wherein: the sample to be tested is placed on said support in a relatively viscous state, and further including treating the sample on said support to reduce its viscosity.

12. A method as defined in claim 1, wherein: rotation of said wafer is effected by coupling said wafer to an energy field.

13. Apparatus for determining the viscosity of a liquid sample, comprising:
   means for supporting from below a quantity of the sample so that the latter has an upper exposed surface forming a meniscus;
   a wafer for support on the sample meniscus;
   means rotating the wafer to spin the wafer on the meniscus of the sample and establish motion in the sample; and
   means monitoring by reflectance the rate of rotation of the wafer as an indication of the viscosity of the sample.

14. Apparatus as defined in claim 13, further including means to treat the sample on said support means to effect a change in its viscosity.

15. Apparatus as defined in claim 14, wherein: said sample treating means comprises means for introducing a liquid substance to the sample on said support means.

16. Apparatus as defined in claim 14, wherein: said sample treating means comprises means for effecting a temperature change of said support means.

17. Apparatus as defined in claim 13, further including means to treat the sample on said supporting means to enable it to coagulate over a period of time, and timing means coupled to said monitoring means to time the interval from a predetermined starting point to the cessation of rotation of said wafer as an indication of the coagulation rate of the sample.

18. Apparatus as defined in claim 13, wherein: said means rotating the wafer comprises an energy field coupled to said wafer.

19. Apparatus as defined in claim 13, wherein: said support means has an upper reflective surface below said sample and said sample is at least translucent, said wafer having means defining at least one eccentric void therein and having an upper opaque surface portion, and said monitoring means comprises means directing a beam of light toward a portion of said reflective surface through said wafer void on each revolution of said wafer, and photodetector means focused on said reflective surface portion and alternately viewing the last-named portion and said opaque surface portion to detect fluctuations of light intensity as an indication of the rate of rotation of said wafer.

20. Apparatus as defined in claim 13, wherein: said support means has an upper reflective surface portion below said sample and said sample is at least translucent, said wafer having means defining at least one eccentric recess therein and having an opaque upper surface portion, and said monitoring means comprises means directing a beam of light toward a portion of said reflective surface through said wafer recess on each revolution of the wafer, and photodetector means focused on said reflective surface portion and alternately viewing the last-named portion and said opaque surface portion to detect fluctuations of light intensity as an indication of the rate of rotation of said wafer.

* * * * *